Jan. 10, 1939.   R. E. PETERSON   2,143,384
STAPLE TACKER AND ATTACHMENTS
Filed July 22, 1936   3 Sheets-Sheet 2
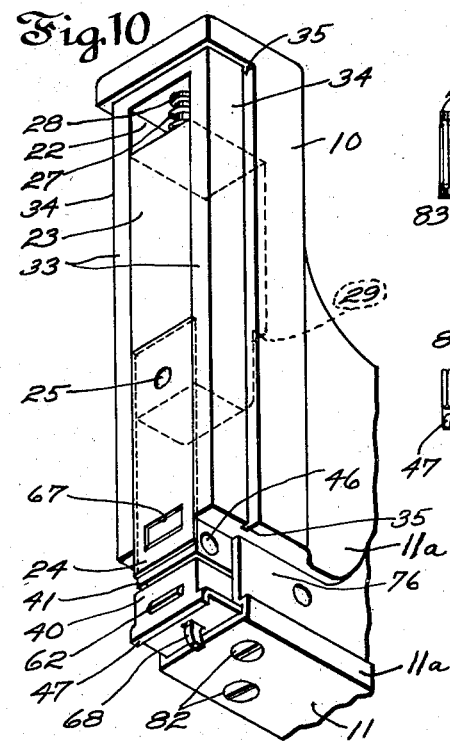
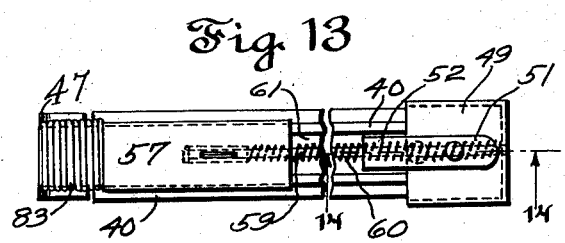
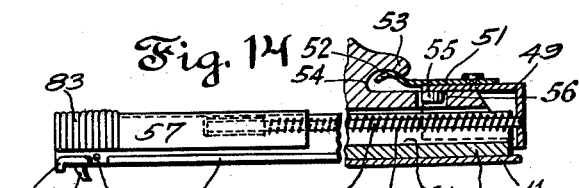
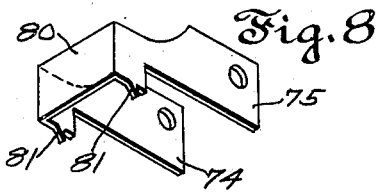
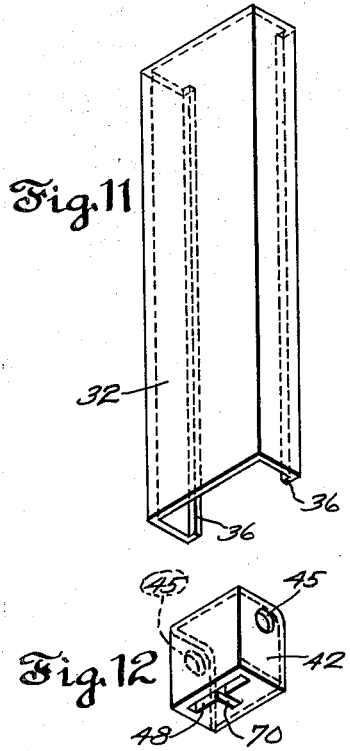
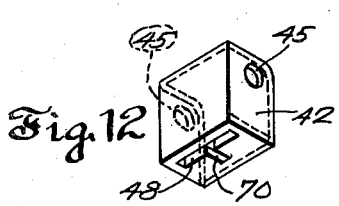
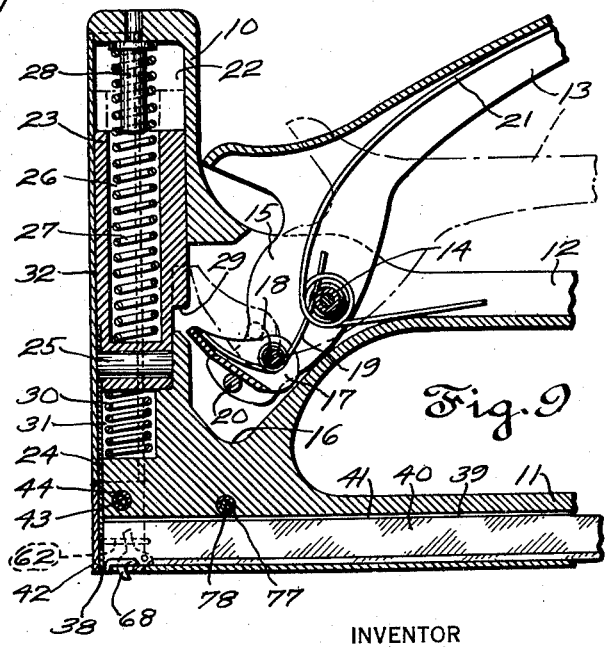
INVENTOR
Roy E. Peterson,
BY
ATTORNEY Jan. 10, 1939.  R. E. PETERSON  2,143,384
STAPLE TACKER AND ATTACHMENTS
Filed July 22, 1936  3 Sheets-Sheet 3
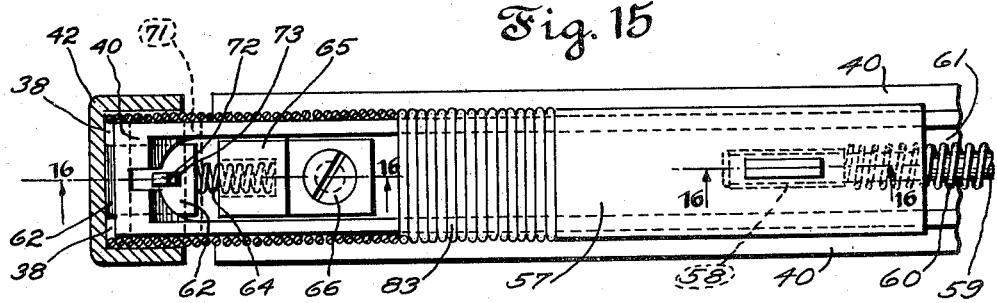
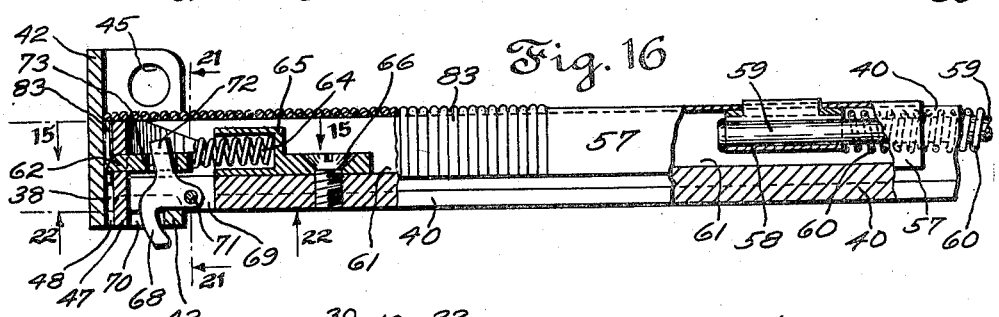
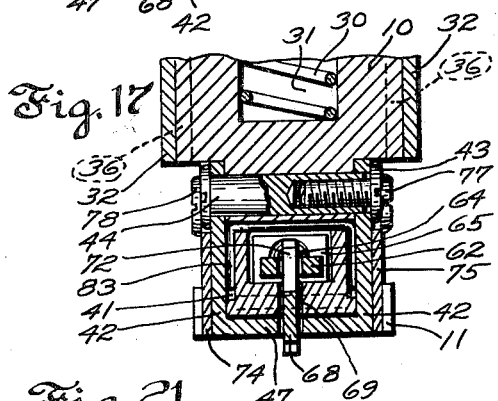
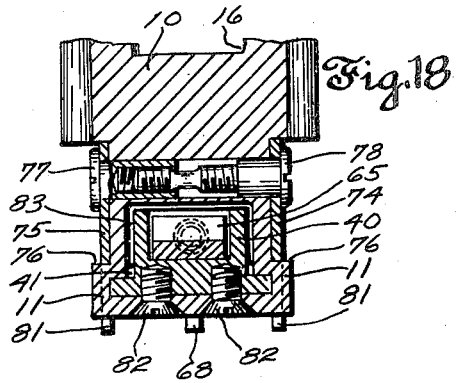
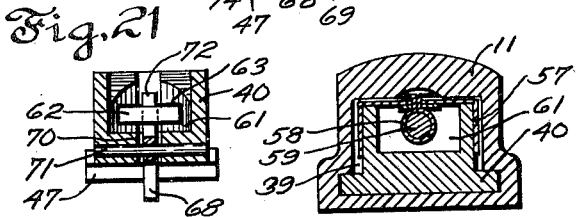
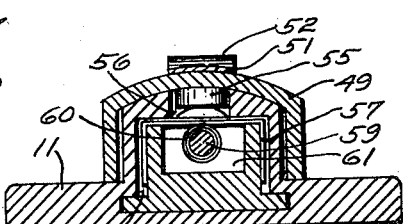
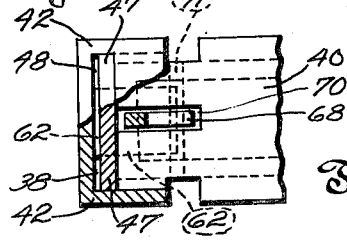
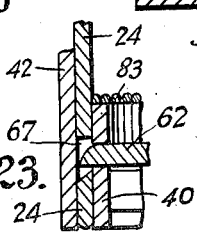
INVENTOR
Roy E. Peterson,
BY
ATTORNEY Patented Jan. 10, 1939

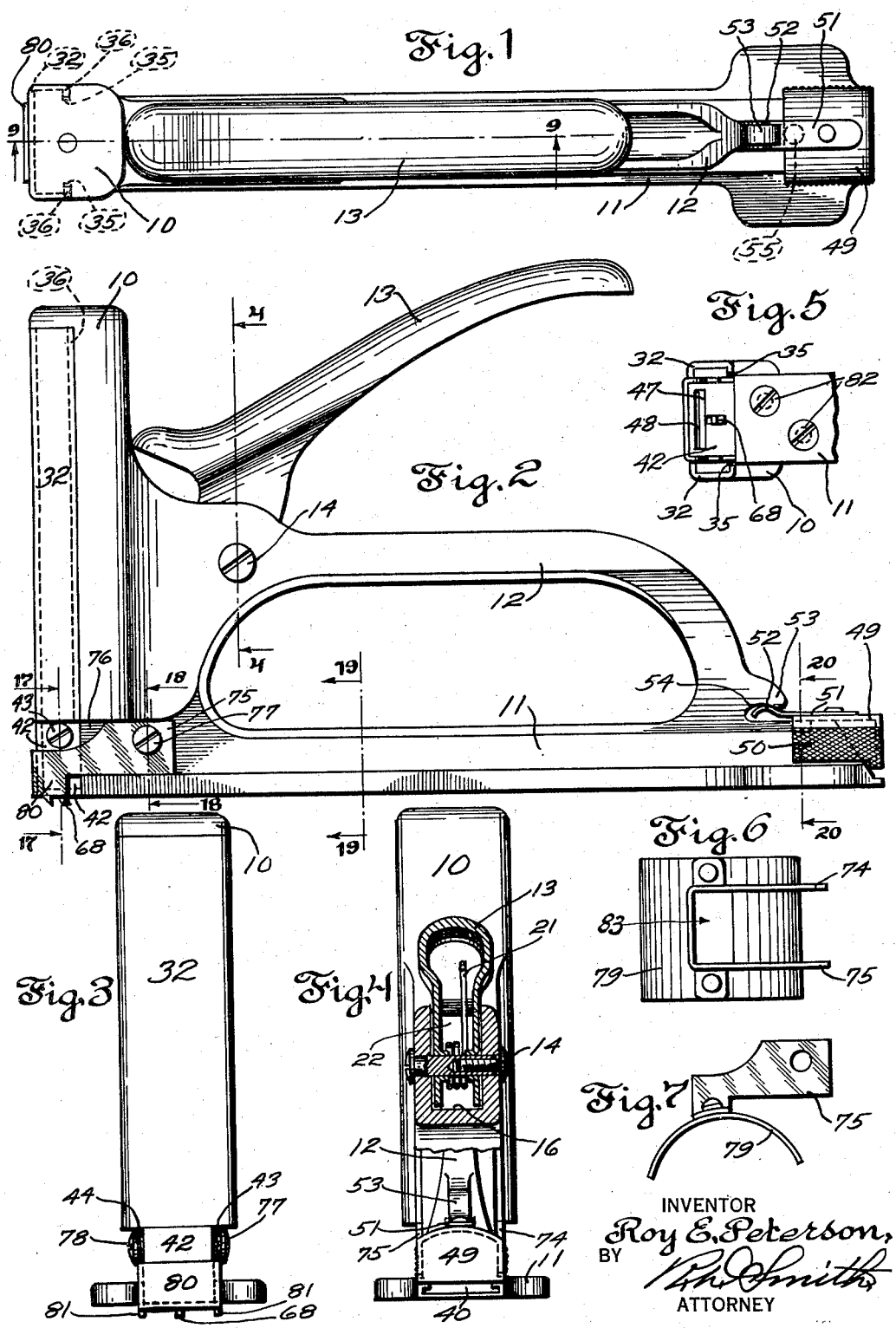

2,143,384

UNITED STATES PATENT OFFICE 2,143,384

STAPLE TACKER AND ATTACHMENTS

Roy E. Peterson, Norwalk, Conn., assignor to The E. H. Hotchkiss Company, Norwalk, Conn., a corporation of Connecticut Application July 22, 1936, Serial No. 91,856

27 Claims. (Cl. 1—49)

This invention relates to portable staple tacking implements designed to be held in the hand of the user and applied against the object or work into which staples are to be driven or tacked and particularly concerns implements of this nature which incorporate means automatically to feed the staples one by one from a stored supply of staples which when exhausted may quickly and conveniently be replenished.

One object of the invention is to provide a tacker which will drive staples into work, or into an object, at points closer to any obstruction which may rise from the staple receiving surface of the work or object than has heretofore been possible.

Another object is to provide a tacker which can eject its driven staples at a point nearer to an extreme sharp corner of the implement frame than has heretofore been possible.

Another object is to armor the staple ejecting corner of the implement very strongly with a relatively thin walled cap which may easily be removed to give access to the interior working parts of the implement particularly at the important working point where the staples are fed and driven.

A further object is to provide a protective and confining cover for a chamber in which the staple driving mechanism may be housed, which cover may readily be applied and removed without the use of screws or analogous separate fastening means and which cover, when assembled in place, shall define the frontmost face and edges of the staple driving head of the implement.

A further object is to provide a staple feeding track member which may be housed within a completely encompassing base portion of the implement frame and inserted therein and removed therefrom and arranged at its front end to interlock rigidly with the removable armor cap before referred to, when these parts are assembled, thereby to determine a positive and accurate relationship between the track member and the cap which shall not depend upon their individual connections to some common supporting frame.

A further object is to provide an improved form of removable cap-like cover at the rear end of the frame chamber that is occupied by the staple feeding track member which cover is featured by means automatically acting to catch and hold the cover in place as a result merely of forcing it home to chamber-covering position, and which means will readily release the cap and permit its removal by the natural way of pulling upon the cap when it is desired to replenish the supply of staples.

A further object is to incorporate in a staple tacker having a powerful spring-operated firing mechanism for ejecting staples with considerable force, an automatic locking mechanism which shall act to preclude hand operation of the firing mechanism until the implement is pressed against an object into which a staple is to be driven, but which shall become unlocked as a mere result of applying the implement in a natural way against such object or work as is to be stapled.

A further object is to arrange an exposed lock releasing part of the locking mechanism so that it will be inconspicuous and difficult to manipulate for this unlocking purpose in any manner other than by applying the implement against the work or object which is to receive the staple. This feature renders the tacker so inconvenient for frivolous use that unauthorized playing with the implement or careless waste of its staples is effectively discouraged. This feature is also a safeguard against the accidental projection of staples in a way to do damage to an operator unacquainted with the machine, or damage to other persons who may be in the path of staples accidentally fired from the machine.

A further object of the present improvements is to provide means for interchangeably attaching to a tacker, a variety of work engaging appliances, such as a pronged member for stretching screening to a position in which it is to be tacked, or a cylinder-fitting curved plate for positioning the tacker so as to drive staples in diametrical relation to the curvature thereof, such attaching means being featured by a cooperative formation and fitting of the appliances in relation to some portion of the tacker frame which positively determines and maintains designed alignment therebetween.

The foregoing and several other important objects of the invention will become clear from the description to follow, in which reference is had to the accompanying drawings. In the drawings:

Fig. 1 is a plan view of a staple tacker embodying illustrative forms of the present improvements.

Fig. 2 is a side elevation of the tacker illustrating a screen-stretching appliance removably attached thereto.

Fig. 3 is a front elevation of the tacker shown in Fig. 2.

Fig. 4 is a rear elevation of the tacker and is a view taken partly in section on the plane 4—4 in Fig. 2.

Fig. 5 is a fragmentary bottom plan view looking upwardly at the front or left end of the tacker in Fig. 2.

Fig. 6 is a plan view of a detached tacker positioning appliance, illustrative of various appliances which may be substituted for the screen stretching appliance of Fig. 2.

Fig. 7 is a side elevation of the appliance shown in Fig. 6.

Fig. 8 is a perspective view of the screen stretching appliance of Fig. 2 shown removed from the frame of the tacker.

Fig. 9 is a view of the front portion of the tacker taken in vertical central section on the plane 9—9 in Fig. 1 looking in the direction of the arrows, with the detachable screen stretching appliance of Fig. 2 removed, the staple track bar in the base being not sectioned.

Fig. 10 is an isometric view of the front portion of the tacker, the channel strip closure, corner nose cap, and screen stretching appliance of Figs. 1 to 5, being removed.

Fig. 11 is an isometric view of the channel strip closure removed.

Fig. 12 is an isometric view of the corner nose cap removed.

Fig. 13 is a plan view of the staple feed track bar and parts supported thereon, removed from its chamber in the base of the appliance, and broken crosswise to indicate considerable contraction of its true length.

Fig. 14 is a similarly contracted view, in side elevation, of the parts shown in Fig. 13, the rear end of the parts together with cooperative portions of the housing being shown in central vertical section on the plane 14—14 in Fig. 13.

Fig. 15 is an enlarged plan view of the parts shown in Fig. 13 certain of the staples being broken away to expose the ram locking mechanism, and the corner nose-cap of the tacker being shown in its assembled relation to the staple track bar and taken in section on the plane 15—15 in Fig. 16.

Fig. 16 is a view in side elevation of the parts shown in Fig. 15 and in parts of its length is taken in section on the planes 16—16 and 16—16 in Fig. 15 looking in the direction of the arrows.

Fig. 17 is a still further enlarged fragmentary view taken in section on the vertical plane 17—17 in Fig. 2, looking in the direction of the arrows.

Fig. 18 is a fragmentary view on a similar scale taken in section on the vertical plane 18—18 in Fig. 2 looking in the direction of the arrows.

Fig. 19 is a view on a similar scale taken on the vertical plane 19—19 in Fig. 2 looking in the direction of the arrows.

Fig. 20 is a view on a similar scale taken on the plane 20—20 in Fig. 2 looking in the direction of the arrows.

Fig. 21 is a view on a similar scale taken in section on the vertical plane 21—21 in Fig. 16 looking in the direction of the arrows.

Fig. 22 is a fragmentary bottom plan view on a similar scale looking upwardly at the left end of the parts in Fig. 16 and is taken partly in section on the horizontal plane 22—22.

Fig. 23 is an enlarged fragmentary view of certain parts as appearing at the left extremity of Fig. 16 and showing also the staple driving ram blade locked in the downmost position which it occupies in Fig. 9.

My improved staple tacker may advantageously be constructed in the actual size represented by Figs. 1 to 5 inclusive, of the drawings. The frame comprises a hollow staple driving head portion 10 at the front end of the tacker, an elongated hollow base portion 11 at the bottom of the tacker, and a bridge-like recessed handle portion 12, all of these portions being rigid with one another, and if desired, formed by an integral metal casting. If made of assembled forms of sheet metal, the frame body or its two halves, on respectively opposite sides of the longitudinal center line 9—9 in Fig. 1, may comprise separate parts which may be secured together by any suitable means, such as by screw fastenings, rivets, eyelets or spot welding.

Certain parts of the staple driving mechanism as well understood in the art comprise a depressible pivoted operating lever 13 mounted on the frame carried pivot screw 14 and having a bifurcated lifter portion 15 projecting downwardly into a recess 16 in the frame casting as shown in Fig. 9. On its lifter portion, the operating lever 13 carries a dog 17 which is free to swing upon a pivot pin 18 carried by the lever portion 15 and urged by the spring 19 against the stop pin 20 but free to yield clockwise about its pivot pin 18. Another spring 21 urges the operating lever 13 to its normal raised position shown by full lines in Figs. 2 and 9.

The staple driving head 10 is recessed to form the chamber 22 which contains a staple driving or ram device composed of the vertically slideable ram block 23 recessed at its lower front face portion to carry the ram blade 24 in flush relation to the front surface of the block, and a round hole through the ram blade is engaged by the end of the block carried dowel pin 25. The ram block 23 contains a vertical bore 26 in which is seated the hammer spring 27 engaged and guided at its top by the stud 28 which is removably inserted in a hole through the top wall of head 10. At its rear lower corner the ram block 23 is cut away to afford a narrow lifter ledge 29 against which the working end of dog 17 engages for raising the ram block to its position shown by broken lines in Fig. 9. In this position the end of the dog escapes the block owing to the arc in which it swings in moving with the lever 13 to the position of parts indicated by broken lines in Fig. 9. A less powerful buffer spring 30 is confined within a bottom portion 31 of the head chamber 22 of reduced size, and when not compressed, spring 30 is long enough partly to absorb the downward blow of the ram block 23 before the latter strikes its positive seat 32. This seat extends around the rear and sides of chamber 22.

The novelty in the present improvements is partly concerned with a removable structure 32 provided for covering and if desired, constraining the staple driving mechanism in chamber 22.

Fig. 10 plainly shows a conformation which may be given to the walls of the staple driving head in its front, bottom and side portions for receiving the cover 32. The maximum overall size of head 10 is cut back at 33 on the front edges and is cut inwardly at 34 in a portion of both lateral surfaces to an extent preferably equal to the wall thickness of the channel strip 32 shown detached in Fig. 11. A groove 35 is sunk in each side of head 10 at the rear edge of each cut back portion 34. Grooves 35 are engageable respectively by the short in-turned flanges 36, 36 carried at the rear edges of the side walls 37, 37 of channel strip 32, which is thereby enabled to slide upwardly to its assembled position shown in Figs. 2 and 3 and to comprise the front-most surface and edges of the staple driving head when assembled in place.

Fig. 9 further shows that the channel strip 32 when assembled in place, constrains and confines the ram block 23 and ram blade 24 to their designed paths of vertical sliding movement with only the clearance necessary to permit their free operation. In this manner, the channel strip is securely held on the frame and provides an easily removable constraining closure for the working parts covered thereby, requiring no screws or loose fastening parts. The arrangement eliminates all projections at the front and side faces of the tacker such as in other constructions limit the nearness with which the staple ejecting orifice of a tacker can be brought to obstructions rising from the surface of the object or work to be stapled. An assembly of unusual simplicity, compactness, sturdiness and finished exterior appearance results.

The elongated horizontal base 11 of the stapler frame has outside lateral faces 11a on each side (Fig. 10) and contains and completely encompasses a chamber or passage 39 extending lengthwise thereof and opening only through the front end and the rear end of the base. The cross sectional shape of this chamber will be clear from Figs. 17 to 20, inclusive, and into it lengthwise from left to right in Fig. 9 may be inserted the staple guiding track bar 40 whose cross sectional shape at different points along its length will be clear from Figs. 10 and 17 to 21 inclusive. A space is thus left between the track bar 40 and the upper and side walls of the base 11 forming an inverted U-shaped passage 41 through which staples 83 are fed toward the front end of the track bar, and admitted one by one to the staple ejecting orifice 38 under the ram blade 24 when the latter is lifted for striking a staple driving blow.

It will be clear from Fig. 10 that when the track bar 40 is held in place within the base chamber 39 by screws 82 and the channel strip 32 of Fig. 11, alone, has been assembled in place to cover the driving head chamber 22, there is still left exposed the front end of the track bar where the staple feeding passage 41 and the staple ejecting orifice 38 communicate. These exposed parts are covered by the nose-like cap 42, shown detached in Fig. 12, which is secured in place by engaged male and female screws 43 and 44 respectively as shown in Fig. 17, the latter snugly fitting aligned holes 45 in the cap, and hole 46 through the metal of the frame. This means alone, of fastening the cap in place, is not relied upon for accurately positioning the cap in relation to the front end of the track bar, but the latter has a down-turned flange or lug 47 engageable with the transverse slot 48 in the bottom wall of the cap, which lug is sufficiently thinner than the width of slot 48 to leave a narrow space which serves as the terminal outlet of staple ejecting orifice 38.

Because of its cubically disposed walls, the cap 42 strongly armors the staple ejecting corner of the tacker and yet provides an enclosing structure permitting of the closest possible location of the staple ejecting orifice 38 to the extreme corner of the implement.

Because fastened by the simple means of interthreaded screws 43—44, and positively located by engagement with lug 47, cap 42 is conveniently removable by a novice, when any jam or trouble caused by defective staples or abusive operation of the tacker calls for attention at this point in the implement, and yet can be restored to its place only in a way that insures its correct positioning in relation to the parts which it covers and constrains.

Novelty also resides in the hollow cap handle 49 shown most clearly in Figs. 1, 2, 4, 13, 14 and 20 which affords a finger grasp for removing and replacing the spring operated staple feeding parts when it is desired to replenish the supply of staples in the magazine chamber 39. Figs. 1, 2 and 4 make plain that this cap handle effectively encloses the rear end of the staple feeding space 41 and the rear end of track bar 40. It is preferably knurled at 50 on its outer lateral surfaces to provide a better fingerhold and carries on its top surface the leaf spring 51 having an upwardly rounded terminal 52 adapted to engage with and slip under a rigid hook 53 projecting from the portion 12 of the frame. A recess 54 under this hook is occupied by spring terminal 52 when the cap handle is forced home.

To further insure against accidental displacement of the cap handle and to take the thrust of the staple feeding spring, a lug 55 projecting downwardly at the front edge of the cap handle is adapted to seat in a hole or orifice 56 in the top wall of the base 11 requiring the cap handle to be slightly lifted to permit its separation from the frame. This is the natural way in which a novice would manipulate it when seeking to replenish the supply of staples in the tacker. The interior parts which are attached to, and withdrawable from the magazine chamber by, cap handle 49 are well understood in the art and include the inverted U-shaped pusher strip 57 riding on track bar 40 and adapted to press forwardly against the staples. The staple pusher strip 57 carries a retaining bearing 58 in which rod 59 is freely slidable. This rod is attached to the rear upright wall of cap handle 49 and is surrounded by the long compression spring 60 which is tensioned between cap handle 49 and bearing 58.

Use is made of the space provided by the front portion of the longitudinal channel 61 which may extend the length of track bar 40, to mount therein in the most compact and effective position, a locking mechanism designed to discourage frivolous use of the tacker and careless waste of its staples, as well as to prevent injury from accidental discharge of staples by an inexperienced operator. This locking mechanism is best shown in Figs. 10, 15, 16, 17, 21 and 22, and comprises a latch plate or lock bolt 62 pressed forwardly through a slot 63 in the front end of the track bar 40 by a compression spring 64 seated within and backed up by an abutment 65 secured to the base wall of the track bar by the screw 66.

The frontmost end of the lock bolt 62 is chamfered on its top edge to cause it to be thrust inwardly toward bar 40 by a downward stroke of the ram blade 24 without obstruction or damage. The ram blade contains a rectangular aperture 67 near its bottom end which in the downmost, or normal position of this blade, registers with the projecting end of the lock bolt 62 which latter is thereupon thrust forwardly through aperture 67 by the spring 64, defeating subsequent attempts to raise the ram by means of the operating lever 13 and dog 17. Means are provided, however, to withdraw bolt 62 from its locking engagement with ram blade 24 in the form of bellcrank lever 68 swingable in a slot 69 through the floor of the track bar 40 and projecting through a slot 70 in the bottom wall of the nose-cap 42. The bell-crank lever 68 is pivotally mounted on a pin 71 held in the track bar 40 and has an upwardly projecting arm 72 passing through a slot 73 in the lock bolt. It is plain from Fig. 16 that in its locking position the bolt 62 normally maintains the downwardly projecting end of the bell-crank lever 68 in its position shown in Figs. 2, 9, 10 and 16, with the result that if the front end of the stapler base is pressed against an object into which a staple is to be driven, the lever 68 will be forced to swing clockwise in Fig. 16, and will retract lock bolt 62 toward the right, releasing the ram blade and the operating handle for operation to drive a staple. It will also be seen that because of the positioning and smallness of the projecting end of lever 68, the latter can conveniently be operated to unlock the mechanism in no way other than the designed way which has been described and which requires no special knowledge or thought on the part of the operator of the stapler. In case the implement and/or lever projection 68 is imperfectly held against the work at the precise time the power spring 27 drives the blade 24 downward, the chamfered top edge of lock bolt 62 will prevent damage to the parts by acting in the manner above described.

The attachments or appliances of Figs. 6, 7 and 8 together with many other forms of analogous appliances, useful in relating the action of the stapler to the work to be stapled, are interchangeably mountable on the frame of the stapler in the manner indicated in Figs. 2, 3, 5 and 18. Each different appliance may be provided with similar mounting arms 74 and 75 to occupy a recess whose surface 76 is sunk in the outside face 11a of each of the lateral walls of the stapler frame which flank the track bar 40. It is apparent from the drawings that this construction positively determines the alignment of each such appliance with the frame. The arms 74, 75 may be secured to the frame by screw holding means 77, 78 respectively, of which an example is shown in Fig. 18. The appliance 79 of Figs. 6 and 7 may conform to the surface of a curtain rod to insure that staples for securing the curtain fabric to the rod may be driven into the rod normal to its surface, and appliance 79 will also hold the fabric of the curtain firmly against the surface of the rod while the staple is being driven. The appliance 80 of Figs. 2 and 8 is provided with the prongs 81 adapted to engage with the mesh of screening material for pulling it taut before a staple is driven to fasten it. My improved tacker may be operated on ordinary kinds of work without the use of special purpose appliances such as 79 and 80.

The improved provisions for mounting such appliances when employed, will be seen to produce a substantially flush and smooth relationship of the assembled parts contributing to the desired ability to drive staples with practically unlimited closeness to whatever obstructions may arise from the surface of the object or work to be stapled. Prongs 81 may be located at the extreme front of appliance 80 to engage screening at a point removed from the staple receiving screen frame which may be contacted by lock releasing lever 68 or this lever may be too large to enter the screen mesh. The aperture 83 in appliance 79 is located to permit lever 68 to project therethrough the extent required to compensate for the thickness of the curved portion of part 79, and to permit full lock releasing retractive movement of the lever 68.

The purpose and functions of the various mechanical features which have been described will in the main have become clear from the foregoing description of their structure and cooperation. In operation the staple tacking implement is grasped by the hands of the user with the palm of the hand against the operating lever 13 and the fingers hooked under handle portion 12 of the frame. The lower front nose of the stapler may be placed very closely into any corner of work to be stapled, for instance, closely against the interior corner of a picture frame. The lever 13 cannot be depressed to discharge a staple until the projecting portion of bell-crank 68 has been pressed against the interior surface of the picture frame at the point a staple is to be driven. When so pressed, the lock bolt 62 is withdrawn from aperture 67 in ram blade 24 and the operator is free to depress lever 13 which will cause dog 17 to lift and escape ram block 23 whereupon hammer spring 27 forces the ram quickly downward to drive a single one of the staples 83 which meanwhile has been automatically fed into vertical line with the ejection orifice 38 by the urge of pusher strip 57 under the action of spring 60. The tacker is now conditioned for a repetition of the staple driving operation described.

Since the constructions described in the foregoing are but examples of many practical ways in which the principles of these improvements may be availed of, the following claims are intended to cover all fair equivalents of the exact structures shown, or which would be suggested to one skilled in the art by the disclosures hereof.

I claim:

1. In a staple tacker including a staple driving ram, a stapling head structure for housing said ram adapted to permit operation of the ram in unusual proximity to objects obstructively outstanding from the work to be stapled, embodying a frame body having a front face recessed in a longitudinal portion spaced from the top of the body thereby to form a ram containing chamber having a closed upper end, and a front cover member having a flat plate-like wall arranged to bridge the open side of said chamber and removably secured against said front face of the frame body in a manner to constitute the frontmost portion of the stapling head structure along said longitudinal portion of the frame body.

2. In a staple tacker as set forth in claim 1, a stapling head structure as defined in said claim in which the said front cover member has side walls projecting rearwardly from the lateral extremities respectively of said plate-like wall to a less extent than the depth of the said ram-containing chamber from front to back.

3. In a staple tacker as set forth in claim 1, a stapling head structure as defined in said claim in which the said front cover member has side walls projecting rearwardly from the lateral extremities respectively of said plate-like wall, and the said frame body has external lateral surfaces in part recessed to a depth corresponding to the thickness of said side walls thereby to permit said side walls to overlap the recessed portions of said lateral surfaces and fall flush with the unrecessed portions thereof.

4. In a staple tacker as set forth in claim 1, a stapling head structure as defined in said claim in which the said front cover member has side walls projecting rearwardly from the lateral extremities respectively of said plate-like wall and also flanges extending inwardly from said side walls, and the said frame body has grooves in its external lateral surfaces opposite the said ram-containing chamber shaped and arranged to admit said flanges into sliding engagement therewith.

5. In a staple tacker as set forth in claim 1, a stapling head structure as defined in said claim in which the said front cover member has side walls projecting rearwardly from the lateral extremities respectively of said plate-like wall and also flanges extending inwardly from said side walls, and the said frame body has external lateral surfaces in part recessed to a depth corresponding to the thickness of said side walls and containing grooves at the junction of their recessed and unrecessed portions shaped and arranged to admit said flanges into sliding engagement therewith, whereby said side walls are permitted to overlap the recessed portions of said lateral surfaces and fall flush with the unrecessed portions thereof.

6. In a staple tacker as set forth in claim 1, a stapling head structure as defined in said claim in which the said frame body is shaped at the closed end of the said ram-containing chamber to project forwardly an extent to fall flush with the external front surface of the said plate-like wall of the said cover member.

7. In a staple tacker as set forth in claim 1, a stapling head structure as defined in said claim in which the said front cover member has side walls projecting rearwardly from the lateral extremities respectively of said plate-like wall, and the said frame body has external lateral surfaces in part recessed to a depth corresponding to the thickness of said side walls and is shaped at the closed end of the said ram-containing chamber to project forwardly an extent to fall flush with the external front surface of said plate-like wall of the front cover member thereby to permit said side walls to overlap the recessed portions of said lateral surfaces and to cause all external surfaces of said front cover member to fall flush with the corresponding surfaces of the frame body.

8. In a staple tacker as set forth in claim 1, in combination with a stapling head structure as defined in said claim, a corner cap removably secured to the said frame body below the said front cover member and having a front wall abutting said plate-like wall of said cover member in end-to-end flush relationship thereto thereby to prevent removal of said cover member from said frame body in one direction.

9. In a staple tacker as set forth in claim 1, in combination with a stapling head structure as defined in said claim, a corner cap removably secured to the said frame body having a bottom wall containing a staple outlet and a front wall disposed at right angles to said bottom wall positioned to abut against said plate-like wall of the said front cover member in end-to-end flush relationship thereto thereby to form an outermost front and bottom portion of the stapling head structure at the staple ejecting corner thereof and to prevent removal of said cover member from said frame body in one direction.

10. In a staple tacker as set forth in claim 1, in combination with a stapling head structure as defined in said claim, a corner cap having a bottom wall containing a staple outlet and side walls flanking and secured to the external lateral surfaces of the said frame body and a front wall positioned to abut against said plate-like wall of the said front cover member in end-to-end flush relationship thereto thereby to form an outermost front, bottom and side portion of the stapling head structure at the staple ejecting corner thereof and to prevent removal of said cover member from said frame body in one direction.

11. In a hand operated tacker for feeding and driving staples, a portable frame having opposite lateral surfaces terminating proximate a staple ejecting corner of the tacker, and a frame locating appliance shaped to engage the work to be stapled in a manner to position said frame in definite relation to said work and further constructed and arranged to straddle said corner of the tacker and to be removably secured to the said lateral surfaces of the frame.

12. In a hand operated tacker for feeding and driving staples, a portable frame having outside lateral faces terminating proximate a staple ejecting corner of the tacker and having recesses in each of said lateral faces, and a frame locating appliance shaped to engage the work to be stapled in a manner to position said frame in definite relation to said work and further constructed and arranged to straddle said corner of the tacker and in part to occupy and fit said recesses thereby to be held in laterally nonprotruding relationship to said outside faces and in designed positive alignment with the frame of the tacker.

13. In a hand operated tacker for feeding and driving staples, a portable frame having outside lateral faces terminating proximate a bottom edge of the tacker and having recesses in said lateral surfaces elongated in the direction in which said bottom edge of the tacker is disposed, and a frame locating appliance having a portion thereof spaced from said frame and shaped to engage the work to be stapled in a manner to position said frame in definite relation to said work and further including two mounting arms formed and spaced to snugly engage and occupy said recesses respectively without projecting laterally beyond said outside faces thereby to be held in designed positive alignment with the frame of the tacker.

14. In combination with a hand operated tacker as described in claim 13, interengageable means extending through the said appliance arms and through said frame and arranged cooperatively with said arms in a manner to secure the said frame locating appliance rigidly and removably to the said portable frame when it occupies the said recesses.

15. In a staple feeding tacker adapted to be applied against an object into which a staple is to be tacked, a portable frame containing a staple feeding chamber extending along its bottom edge and terminating at a staple ejecting corner portion of the tacker, a staple tacking block-like ram housed in an upper portion of said frame and constrained to reciprocate in a direction angularly related to said chamber, a thin staple driving blade rigid with said ram and projecting therefrom to reciprocate near the said corner portion of the tacker, and means located in said chamber near the said corner portion of the tacker and movable therein to lockingly engage and release said blade.

16. In a hand operated tacker implement for driving staples into work against which the implement is applied, a portable frame including a staple driving front head, an elongated base structure in rigid relation thereto and extending to the rear from said head, and a handle structure rigid with said head and base structures, the said base structure containing and completely encompassing a passage extending longitudinally therethrough and opening at the front and rear ends of the base structure, a staple guiding track bar longitudinally insertable in said passage and occupying the length thereof, a removable closure carried by said frame and covering the front end of said track bar, and a removable cap-like device engageable with said frame and covering the rear end of said track bar, together with staple feeding devices insertable in said passage and movable lengthwise of said track bar and attached to said device.

17. In a hand operated tacker for driving staples into work against which the implement is applied, a portable frame including a staple driving head at the front thereof, and an elongated base structure in rigid angular relation thereto said base structure containing a longitudinal passage, a staple guiding channel-shaped bar extending lengthwise in said passage, a staple driving blade slidably mounted in said head to reciprocate past the front end of said channel bar, and mechanism occupying the channel space in said bar including a part projectable from said bar into locking engagement with said blade.

18. In a hand operated tacker for driving staples into an object against which the implement may be applied, a portable frame including a staple driving head at the front thereof and an elongated base structure disposed in rigid angular relation thereto, said base structure having a longitudinal passage extending therethrough, a staple guiding channel-shaped bar in said passage, a staple driving blade slideably mounted in said head to reciprocate past the front end of said channel bar, and mechanism carried by said bar including a lock bolt projectable therefrom into locking engagement with said blade and a tongue projectable from said bar in a direction to press against the object into which a staple is to be driven, said bolt and tongue being so operatively related that movement of the tongue inwardly toward said bar causes movement of the bolt inwardly toward said bar thereby to retract the bolt from locking engagement with said blade.

19. Locking mechanism for defeating manual operation of a staple driving implement including in combination with a staple driving ram blade, a frame supporting said ram blade for reciprocative movement, a lock bolt slidably carried by said frame and constrained to move into and out of the path of movement of said ram blade, a spring urging said bolt toward the path of movement of the ram blade, and a bell crank lever pivotally carried by said frame, one arm of said lever being operatively related to said lock bolt and the other arm of said lever being shaped and arranged to project from said frame when the lock bolt is positioned in the path of movement of the ram.

20. In a stapling machine, a reciprocating ram blade and locking means for holding said ram blade against operative movement when the machine is out of engagement with the work to be stapled, said means comprising an apertured portion in the ram blade, a lock mechanism including a bolt operatively engageable with said apertured portion of the ram blade, yieldable means arranged constantly to urge said bolt toward the path of movement of said apertured portion, a pivoted bell crank lever having one arm thereof projecting from the machine and swingable inwardly of the machine when pressed against the work to be stapled, and having another arm so operatively engaged with said lock mechanism that inward swinging of the lever will retract said bolt from locking engagement with the ram against the action of said yieldable means.

21. In a tacker for feeding and driving staples, in combination, a portable frame containing angularly related staple driving and staple feeding chambers extending respectively along the front and bottom edges of the tacker and communicating near a staple ejecting corner of the tacker, a staple feeding track bar occupying and projecting from the front end of said staple feeding chamber and having a longitudinal recess terminating at a perforated wall forming the front end of said bar, a ram blade reciprocative in said staple driving chamber, a lock bolt slidably penetrating said perforated front wall of the track bar and projectable into the path of reciprocative movement of said ram blade, a corner cap having an aperture and removably secured to said frame in a manner to cover the communicating ends of said chambers and the projecting front end of said track bar, and means to operate said lock bolt including an element projecting from said cap through the said aperture therein.

22. In a tacker for feeding and driving staples, the combination defined in claim 21 in which the said aperture in the said corner cap comprises a T-shaped slot one portion of which is disposed to pass staples ejected from the staple driving chamber and another portion of which is occupied by the said projecting element of the said lock bolt operating means.

23. In a refillable tacker for feeding and driving staples, a frame structure having a hollow portion encompassing an elongated staple magazine chamber one of whose ends opens through said frame structure to admit a fresh charge of staples, a staple guiding track bar contained in said chamber, staple feeding devices adapted to be inserted into said chamber through its open end, a cap-like member carrying said devices and shaped to hood a portion of said structure and to cover the open end of the chamber, and snap-action fastening means carried by said member and arranged cooperatively with portions of said frame exterior to said chamber releasably to hold said member proximate the exterior of said frame structure in position to cover said open end of the chamber.

24. In a refillable tacker for feeding and driving staples, a frame containing a staple magazine chamber having one end opening through the frame to admit a fresh charge of staples, a cap-like member shaped to cover the open end of the chamber, and means releasably to hold the cap in a position to cover the end of the chamber including two recessed portions of the frame and two projections carried by the cap said projections being adapted respectively to engage simultaneously with the recessed frame portions, and one of the said projections being constructed to yield when the cap is applied to and removed from said frame.

25. In a stapling machine, a stapling head including in combination with a staple driving ram, a frame body having a front face recessed to form a channel shaped space containing said ram, and a removable plate-like member having a front wall bordering said channel shaped space and overlapping a longitudinal portion of said front face of the frame body and positioned to present its inner surface to direct guiding contact with said ram thereby to constrain said ram to sliding movement lengthwise of said chamber and to constitute the frontmost external structure of the stapling head in its said longitudinal portion together with a power spring arranged to act upon said ram and housed in said channel shaped space thereby to be rendered accessible by removing said plate-like member from the front face of the frame body.

26. In a stapling machine including a member guided for translative movement to drive a staple, safety lock mechanism for preventing at times retractive movement of said member after the latter has performed a staple driving blow including in combination with an upwardly disposed detent edge carried by said member, a downwardly disposed staple driving edge carried by said member and a safety element having a locking end reciprocative between positions for engaging and clearing each of said edges at different times, said element further having an upwardly disposed portion of its said end inclined obliquely to the path of movement of said driving edge of said member thereby when engaged by said driving edge during a staple driving blow thereof to be cammed aside by said driving edge to permit the latter to pass said safety element.

27. In a hand tacker or the like, mechanism for restraining a thin reciprocative staple driving blade or the like against longitudinal movement including in combination with a staple driving end portion of said blade containing an aperture, a frame wall presenting an inner face in guiding contact with one surface of said end portion of the blade, and a lock tongue mounted in the tacker on the opposite side of said blade from said wall in a manner to move through said aperture and into contact with said frame wall for interceptively engaging said blade.

ROY E. PETERSON.